(12) United States Patent
Fu et al.

(10) Patent No.: US 12,387,377 B1
(45) Date of Patent: Aug. 12, 2025

(54) MACHINE LEARNING-BASED METHOD FOR CALIBRATING A CAMERA WITH RESPECT TO A SCENE

(71) Applicant: The Education University of Hong Kong, Hong Kong (HK)

(72) Inventors: Hong Fu, Hong Kong (HK); Ziyu He, Hong Kong (HK); Yitong Wang, Hong Kong (HK); Xiao Li, Hong Kong (HK)

(73) Assignee: The Education University of Hong Kong, Hong Kong (HK)

( * ) Notice: Subject to any disclaimer, the term of this patent is extended or adjusted under 35 U.S.C. 154(b) by 0 days.

(21) Appl. No.: 18/625,232

(22) Filed: Apr. 3, 2024

(51) Int. Cl.
*G06T 7/80* (2017.01)

(52) U.S. Cl.
CPC ...... *G06T 7/80* (2017.01); *G06T 2207/10016* (2013.01); *G06T 2207/20081* (2013.01); *G06T 2207/20084* (2013.01)

(58) Field of Classification Search
CPC ............. G06T 7/80; G06T 2207/10016; G06T 2207/20081; G06T 2207/20084
See application file for complete search history.

(56) References Cited

U.S. PATENT DOCUMENTS

| | | | | |
|---|---|---|---|---|
| 6,877,863 B2 * | 4/2005 | Wood | .................. | H04N 9/3185 353/42 |
| 7,182,466 B2 * | 2/2007 | Sunaga | .................... | H04N 5/74 353/69 |
| 7,782,387 B2 * | 8/2010 | Azuma | .................. | H04N 25/68 359/662 |
| 8,676,427 B1 * | 3/2014 | Ferguson | ............ | G08G 1/0965 701/23 |
| 9,753,126 B2 * | 9/2017 | Smits | .................... | G01S 17/003 |
| 10,067,230 B2 * | 9/2018 | Smits | .................... | G01S 17/86 |
| 10,261,183 B2 * | 4/2019 | Smits | .................... | G01S 7/4868 |
| 10,379,220 B1 * | 8/2019 | Smits | .................... | G01S 7/4811 |
| 2011/0210979 A1 * | 9/2011 | Furui | .................... | G03B 37/04 345/619 |
| 2013/0245877 A1 * | 9/2013 | Ferguson | ............... | G05D 1/249 701/23 |
| 2014/0303827 A1 * | 10/2014 | Dolgov | ................. | B60W 30/00 701/23 |
| 2015/0094897 A1 * | 4/2015 | Cuddihy | ............... | B60K 35/81 701/23 |

(Continued)

*Primary Examiner* — Michael B. Pierorazio
(74) *Attorney, Agent, or Firm* — Idea Intellectual Limited; Sam T. Yip

(57) ABSTRACT

The present invention provides a machine learning-based method for calibrating a camera with respect to a scene, comprising: setting up, in the scene, light sources including: a first group of light sources arranged in a non-linear manner on a first plane and a second group of light sources arranged in a non-linear manner on a second plane orthogonal to the first plane; labelling each light source with a serial number; determining 3D global coordinates of each light source in the scene; configuring the light sources to luminate sequentially; configuring the camera to capture a video of the scene when the light sources sequentially luminate; extracting 2D pixel coordinates of each light source from the video using object detection machine-learning model; matching 3D global coordinates for each light source with respective 2D pixel coordinates to construct a projective relation; and obtaining a projection matrix of the camera from the projective relations.

20 Claims, 5 Drawing Sheets

(56) References Cited

U.S. PATENT DOCUMENTS

| | | | | |
|---|---|---|---|---|
| 2015/0336502 A1* | 11/2015 | Hillis | ............... | G05D 1/0088 |
| | | | | 701/23 |
| 2017/0240096 A1* | 8/2017 | Ross | ............... | G05D 1/0212 |
| 2017/0359573 A1* | 12/2017 | Kim | ............... | H04N 17/002 |
| 2022/0039874 A1* | 2/2022 | Choi | ............... | A61B 90/37 |
| 2022/0171412 A1* | 6/2022 | Cui | ............... | G08B 3/10 |
| 2022/0201262 A1* | 6/2022 | Chen | ............... | H04N 9/3185 |
| 2023/0010713 A1* | 1/2023 | Park | ............... | G01S 17/88 |
| 2023/0377197 A1* | 11/2023 | Napolskikh | ............ | G01C 11/06 |

* cited by examiner

S100

S101 — setting up, in the scene, a plurality of light sources including: a first group of light sources arranged in a non-linear manner on a first plane and a second group of light sources arranged in a non-linear manner on a second plane orthogonal to the first plane S102 — labelling each light source with a serial number S103 — determining 3D global coordinates of each light source in the scene S104 — configuring the plurality of light sources to luminate sequential in a specific order S105 — configuring the camera to capture a video of the scene over a capturing period when the plurality of light sources is configured to sequentially luminate S106 — extracting 2D pixel coordinates of each light source from the captured video using an object detection neural network S107 — matching 3D global coordinates for each light source with respective 2D pixel coordinates to construct a projective relation S108 — obtaining a projection matrix of the camera from the constructed projective relations

FIG. 2

MACHINE LEARNING-BASED METHOD FOR CALIBRATING A CAMERA WITH RESPECT TO A SCENE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to camera calibration. More specifically, the present invention relates to a machine learning-based method for calibrating a camera with respect to a large scene.

BACKGROUND OF THE INVENTION

Camera calibration is a crucial step in computer vision, aimed at determining a camera's internal and external parameters. These parameters play a fundamental role in mapping three-dimensional world coordinates onto image coordinates. Camera calibration is essential for various computer vision applications, particularly for tasks involving three-dimensional (3D) reconstruction. Most current camera calibration methods are primarily designed for small scenes, focusing on the calibration of internal and external parameters. However, the calibration process is influenced by many factors and can be either time-consuming or resource-intensive.

One commonly used calibration method is the direct linear transform (DLT) (as shown in FIG. 1A). It operates by computing a projection transformation matrix using a set of known 2D image points and their corresponding 3D world coordinates. This matrix facilitates the conversion of 3D to 2D coordinates. A minimum of 6 pairs of known 2D-3D correspondences is required due to the projection transformation matrix's 11 degrees of freedom. For each counterpart pair of points, two linear equations can be established, leading to a linear system of equations with a 12×12 matrix when using 6 pairs. Solving this linear system yields one possible solution for the projection transformation matrix, typically through a least-squares method. This matrix represents the transformation from 3D world coordinates to 2D image coordinates, serving as a fundamental component in computer vision tasks. While the DLT method is relatively simple, it's often advisable to use more than 6 point-pairs, say 12 point-pairs, to mitigate noise effects. However, manually identifying corresponding points can be time-consuming, especially in multi-camera calibration scenarios.

Another calibration method is the Zhang Zhengyou technique, introduced in 1999. In this method a calibration board (e.g., a chessboard) is photographed from different positions and orientations to determine camera parameters (as shown in FIG. 1B). The calibration board's chessboard pattern is adopted due to its easily detectable corners. The calibration process involves positioning the board differently and capturing images from various perspectives, establishing correspondences between 2D and 3D points. The algorithm detects chessboard corners in each image, records their positions, and constructs a model for parameter estimation. While user-friendly, this method's accuracy heavily depends on image quality. Blurry or noisy images may hinder accurate corner extraction, affecting calibration results.

Self-calibration (as shown in FIG. 1C) is a technique that doesn't rely on calibration objects or known world coordinates. It involves capturing images from different angles, extracting features, establishing correspondences, and using geometric relationships to compute camera parameters. This method doesn't require prior 3D-2D point correspondences but may yield parameters with a scale factor. Thus, it's unsuitable for directly calculating real-world dimensions, making it inconvenient for large-scale multi-camera calibration.

Large-scale multi-camera calibration poses challenges, especially for Zhang's method, as knowing camera extrinsic pose is crucial. Large calibration boards may be difficult to handle and detect accurately. In scenarios like a 5 m×5 m scene with a 1 m×1 m calibration board, moving the board and ensuring precise corner detection become problematic. In such cases, considering alternative techniques or strategies like using multiple calibration boards or a combination of manual and automated methods for board detection. Robust calibration algorithms suitable for large setups may also be explored. When calibrating multiple cameras with DLT, manually finding corresponding points can be time-consuming, especially with many cameras and points. Similarly, self-calibration without known object dimensions or reference objects can be challenging. These methods often require additional constraints or external information for accurate absolute scale information.

SUMMARY OF THE INVENTION

According to one aspect of the present invention, a machine learning-based method for calibrating a camera with respect to a scene is provided. The method comprises: setting up, in the scene, a plurality of light sources including: a first group of light sources arranged in a non-linear manner on a first plane and a second group of light sources arranged in a non-linear manner on a second plane orthogonal to the first plane; labelling each light source with a serial number; determining 3D global coordinates of each light source in the scene; configuring the plurality of light sources to luminate sequentially in a specific order; configuring the camera to capture a video of the scene over a capturing period when the plurality of light sources is configured to sequentially luminate; extracting 2D pixel coordinates of each light source from the captured video using an object detection machine-learning model; matching 3D global coordinates for each light source with respective 2D pixel coordinates to construct a projective relation; and obtaining a projection matrix of the camera from the constructed projective relations.

According to a further aspect of the present invention, a non-transitory computer-readable storage medium is provided to store a program including instructions for performing a machine learning-based method for calibrating a camera with respect to a scene. The method comprises: setting up, in the scene, a plurality of light sources including: a first group of light sources arranged in a non-linear manner on a first plane and a second group of light sources arranged in a non-linear manner on a second plane orthogonal to the first plane; labelling each light source with a serial number; determining 3D global coordinates of each light source in the scene; configuring the plurality of light sources to luminate sequentially in a specific order; configuring the camera to capture a video of the scene over a capturing period when the plurality of light sources is configured to sequentially luminate; extracting 2D pixel coordinates of each light source from the captured video using an object detection machine-learning model; matching 3D global coordinates for each light source with respective 2D pixel coordinates to construct a projective relation; and obtaining a projection matrix of the camera from the constructed projective relations.

The method provided by the present invention does not require extensive computations like the self-calibration method, nor does it need manual interventions to establish the relationship between 3D points and 2D points as in DLT. It is also not limited by the clarity requirements of photos taken by the calibration board. The provided method merely requires the light sources to illuminate (or flash) sequentially in an order predetermined in advance. The use of a sequential flashing light source can enhance the object detection rate and eliminate the ambiguity caused by multiple markers used in some existing methods. Additionally, even when filming in different scenes, the detection of each light source will be highly accurate due to the absence of obstructions around the lights. Consequently, cameras with different viewing angles in large venues can be calibrated quickly.

BRIEF DESCRIPTION OF THE DRAWINGS

Aspects of the present disclosure may be readily understood from the following detailed description with reference to the accompanying figures. The illustrations may not necessarily be drawn to scale. That is, the dimensions of the various features may be arbitrarily increased or reduced for clarity of discussion. There may be distinctions between the artistic renditions in the present disclosure and the actual apparatus due to manufacturing processes and tolerances. Common reference numerals may be used throughout the drawings and the detailed description to indicate the same or similar components.

FIG. 2 shows a flow chart of a machine learning-based method for calibrating a camera with respect to a scene in accordance with one embodiment of the present invention.

DETAILED DESCRIPTION

In the following description, preferred examples of the present invention will be set forth as embodiments which are to be regarded as illustrative rather than restrictive. Specific details may be omitted so as not to obscure the present disclosure; however, the disclosure is written to enable one skilled in the art to practice the teachings herein without undue experimentation.

Referring to FIG. 2 for the following description. In accordance with one embodiment of the present invention, a machine vision-based method S200 is provided for determining a range of motions of joints of a hand of a subject. The machine vision-based method S100 comprises:

S101: setting up, in the scene, a plurality of light sources including: a first group of light sources arranged in a non-linear manner on a first plane and a second group of light sources arranged in a non-linear manner on a second plane orthogonal to the first plane;

S102: labelling each light source with a serial number;

S103: determining 3D global coordinates of each light source in the scene;

S104: configuring the plurality of light sources to luminate sequentially in a specific order;

S105: configuring the camera to capture a video of the scene over a capturing period when the plurality of light sources is configured to sequentially luminate;

S106: extracting 2D pixel coordinates of each light source from the captured video using an object detection machine-learning model, such as a yolov8 model;

S107: matching 3D global coordinates for each light source with respective 2D pixel coordinates to construct a projective relation; and S108: obtaining a projection matrix of the camera from the constructed projective relations.

Figure 1A:
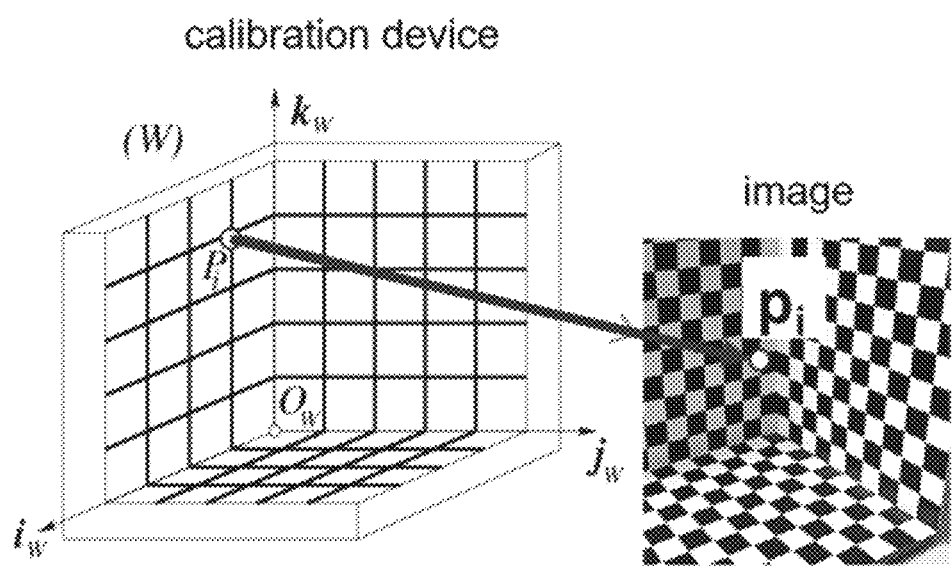
FIG. 1A to 1C shows some existing camera calibration methods.
Figure 1B:
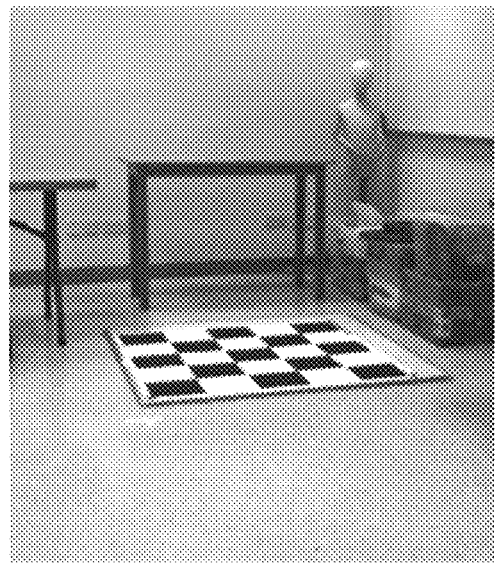
Figure 1C:
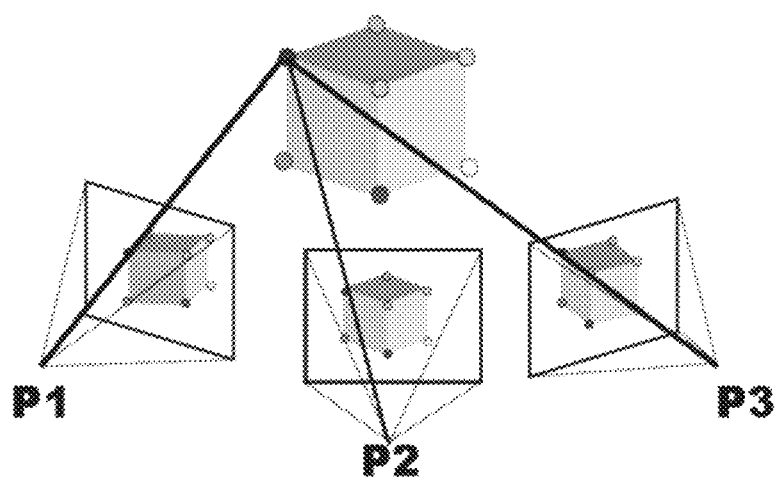
Figure 3:
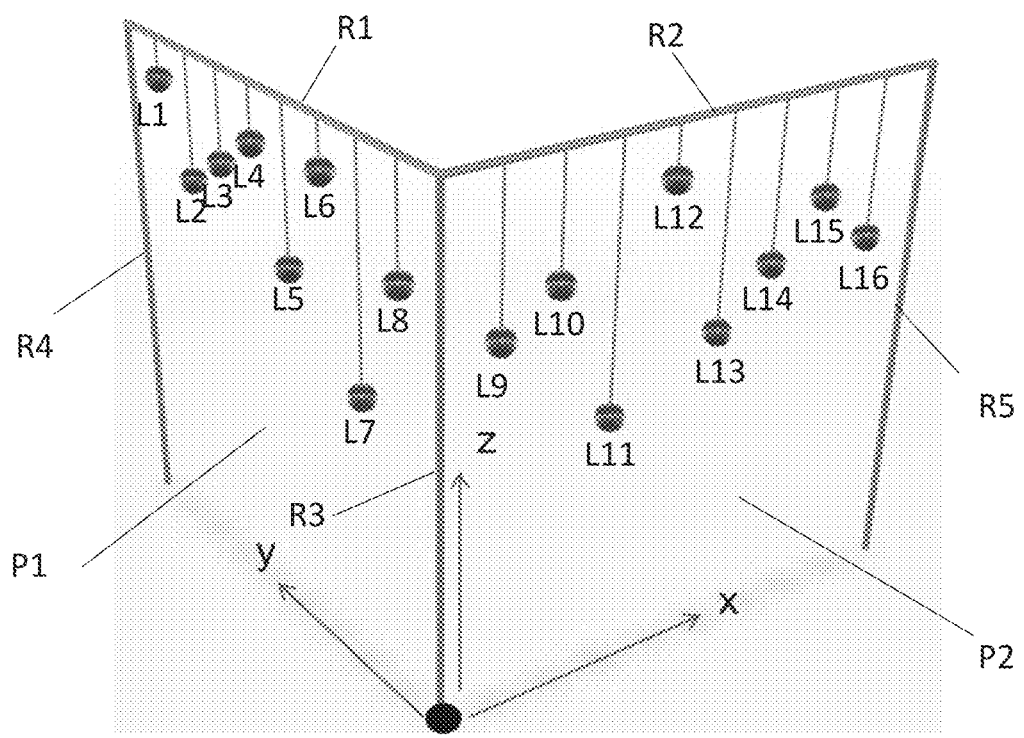
FIG. 3 shows a simplified diagram of a configuration of light sources for calibrating a camera with respect to a scene in accordance with one embodiment of the present invention.

Referring to FIG. 3 for the following description. In one exemplary configuration of the light sources, two horizontally oriented rods R1 and R2 and three vertically oriented rods R3 to R5 may be used to construct the two adjacent and orthogonal planes P1 and P2. That is, the plane P1 is formed with rods R1, R3 and R4 and the plane P2 is formed with rods R2, R3 and R5. A first group of eight light sources L1 to L8 are hanged from the horizontally oriented R1 with different lengths of strings such that the light sources L1 to L8 are arranged in a non-linear manner on plane P1. A second group of eight light sources L9 to L16 are hanged from the horizontally oriented R2 with different lengths of strings such that the light sources L9 to L16 are arranged in a non-linear manner on plane P2.

In step S106, the object detection machine-learning model may be configured to receive a plurality of video frames from the captured video; and sequentially process the video frames to generate an object detection output for each video frame, wherein the object detection output for each video frame contains the serial number and 2D pixel coordinates of the light source that luminates in the video frame.

In particular, the object detection machine-learning model may be configured to determine the serial number of the light source that luminate in each of the video frame based on the specific order of the light sources being configured to luminate; generate a spatial feature map for the video frame using a convolutional layer; and generate the 2D pixel coordinates of the light source that luminates in the video frame based on the spatial feature map.

In some embodiments, an empty dictionary may be defined to store the 3D global coordinates and 2D pixel coordinates of light sources. When the object detection machine-learning model processes a current video frame, if there are no 2D pixel coordinates in the dictionary that are close to the 2D pixel coordinates generated for the current video frame (e.g., within a certain threshold), it means that this light source has just turned on, and the generated 2D pixel coordinates can be added to the dictionary. If there are already coordinates in the dictionary that are close to generated 2D pixel coordinates, it indicates that the light source that luminate in the current video frame has been processed before.

The object detection machine-learning model may be trained over a plurality of training iterations before performing the camera calibration. In each training iteration, a training video frame including a training light source that luminates in the training video frame is fed to the object detection machine-learning model to obtain a predicted bounding box of the training light source.

A loss function according to a ratio of an intersection area to a union area of the predicted bounding box and a true bounding box may be obtained. The true bounding box is a bounding box of the training light source marked in advance in the training video frame. Parameters of the object detection machine-learning model is then adjusted by utilizing the loss function to maximize the ratio of the intersection area to the union area of the predicted bounding box and the true bounding box.

In some embodiments, the loss function may be a negative value of a natural logarithm of the ratio of the intersection area to the union area of the predicted bounding box and the true bounding box. For instances, for at least one pixel point located within the true bounding box in the training video frame, a first 4-dimensional vector and a second 4-dimensional vector may be determined. Elements in the first 4-dimensional vector are distances from the pixel point to the top, bottom, left and right bounds of the true bounding box respectively, and elements in the second 4-dimensional vector represent distances from the pixel point to the top, bottom, left and right bounds of the predicted bounding box corresponding to the pixel point respectively. Areas of the true bounding box and predicted bounding box according to the second 4-dimensional vector can then be obtained. An intersection area of the predicted bounding box and the true bounding box according to the first 4-dimensional vector and the second 4-dimensional vector is found. A difference between a sum of the acquired area of the predicted bounding box and the acquired area of the true bounding box and the acquired intersection area as the union area is taken to obtain the loss function.

In step S108, the projection matrix is obtained on basis of the following equation:

$$\begin{bmatrix} x \\ y \\ 1 \end{bmatrix} = p = M * P = \begin{bmatrix} M_1 \\ M_2 \\ M_3 \end{bmatrix} * \begin{bmatrix} X \\ Y \\ Z \\ 1 \end{bmatrix}$$

where (x, y) is the 2D pixel coordinates of each light source on the captured image, (X, Y, Z) is the 3D global coordinates of the light source in the scene, M is the projection matrix of the camera to be calibrated, R and t are the rotation matrix and translation vector of the camera with respect to the global coordinate system, which depends on extrinsic and intrinsic parameters of the camera.

Each pair of 2D and 3D counterpart coordinates provides two linear equations about the camera projection matrix P:

$$-M_1 P w_1 + x'_1 (M_3 P w_1) = 0$$

$$-M_2 P w_1 + y'_1 (M_3 P w_1) = 0$$

Assuming 12 light sources are used for calibration, the following matrix is obtained:

$$\begin{bmatrix} -P w_1^T & 0 & x'_1 P w_1^T \\ 0 & -P w_1^T & y'_1 P w_1^T \\ \ldots & \ldots & \ldots \\ -P w_n^T & 0 & x'_n P w_n^T \\ 0 & -P w_n^T & y'_n P w_n^T \end{bmatrix}_{2n*1} \begin{bmatrix} M_1^T \\ M_2^T \\ M_3^T \end{bmatrix}_{12*1} = 0$$

By using least squares method, elements of M'* can be obtained:

$$\begin{bmatrix} m11 & m12 & m13 & m14 \\ m21 & m22 & m23 & m24 \\ m31 & m32 & m33 & m34 \end{bmatrix}$$

Representing M'* in the form of M'*=A b, where A is a matrix having dimension of A is 3*1 and b is a matrix having dimension of b is 1*1:

$$A = \begin{bmatrix} a_1^T \\ a_2^T \\ a_3^T \end{bmatrix} \quad b = \begin{bmatrix} b_1 \\ b_2 \\ b_3 \end{bmatrix}$$

As ρ M'*=ρ[Ab]=K[R, T], where [R, T] is a matrix representing extrinsic parameters of the camera. K is a matrix representing intrinsic parameters of the camera. The value of each element in K[R,T] can be inferred through the M'* just obtained by the least squares method.

$$K = \begin{bmatrix} \alpha & -a\cot\theta & Cx \\ 0 & \frac{\beta}{\sin\theta} & Cy \\ 0 & 0 & 1 \end{bmatrix} \quad R = \begin{bmatrix} r_1^T \\ r_2^T \\ r_3^T \end{bmatrix} \quad T = \begin{bmatrix} t_x \\ t_y \\ t_z \end{bmatrix}$$

$$\rho = \frac{\pm 1}{|a_3|} \quad \begin{aligned} Cx &= \rho^2 (a_1 \cdot a_3) \\ Cy &= \rho^2 (a_2 \cdot a_3) \end{aligned}$$

$$\cos\theta = -\frac{(a_1 \times a_3) \cdot (a_2 \times a_3)}{|a_1 \times a_3| \cdot |a_2 \times a_3|}$$

$$\alpha = \rho^2 |a_1 \times a_3| \sin\theta$$

$$\beta = \rho^2 |a_2 \times a_3| \sin\theta$$

$$r_1 = \frac{(a_2 \times a_3)}{|a_2 \times a_3|}$$

$$r_3 = \frac{\pm a_3}{|a_3|}$$

$$r_2 = r_3 \times r_1$$

$$T = \rho K^{-1} b$$

Therefore, the extrinsic parameters and intrinsic parameters of the camera can be obtained.

Evaluation of Calibration Precision

To evaluate calibration performance of the machine learning-based method provided by the present invention, the calibration precision and calibration time of the provided method are compared with three other camera calibration methodologies including Zhang Zhengyou calibration method, direct linear transformation (DLT) calibration method, camera self-calibration method.

Figure 4:
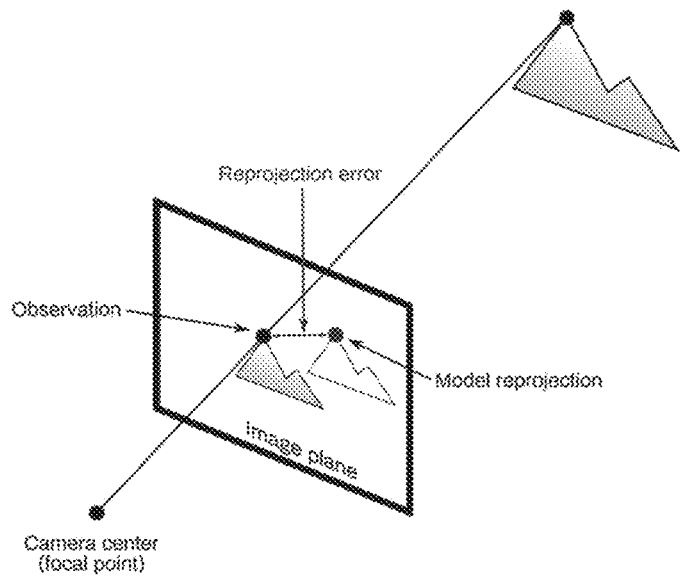
FIG. 4 illustrates a schematic diagram for reprojection error assessment.

FIG. 4 illustrates a schematic diagram for reprojection error assessment. Given a point's coordinates in the world coordinate system, along with the internal and external parameter matrices of the camera, the projection matrix of the camera may be computed by multiplying the homogeneous coordinates of this point. Subsequently, the coordinates projected into the pixel coordinate system under this projection matrix may be determined. The Euclidean distance between this projected point and the corresponding observed point in the original pixel coordinate system is calculated, yielding the reprojection error in pixels. Specifically, the reprojection error can be given by:

$$\text{Error} = \sum_{i=1}^{n} \left( (x_{-i} - x'_{-i})^2 - (y_{-i} - y'_{-i})^2 \right)$$

where, n denotes the total number of points. $x_i$ is the horizontal coordinate of the observation point in the pixel coordinate system, $x_i'$ is the horizontal coordinate of the reprojection point in the pixel coordinate system, $y_i$ is the vertical coordinate of the observation point in the pixel coordinate system, and $y_i'$ is the vertical coordinate of the reprojection point in the pixel coordinate system.

Figure 5:
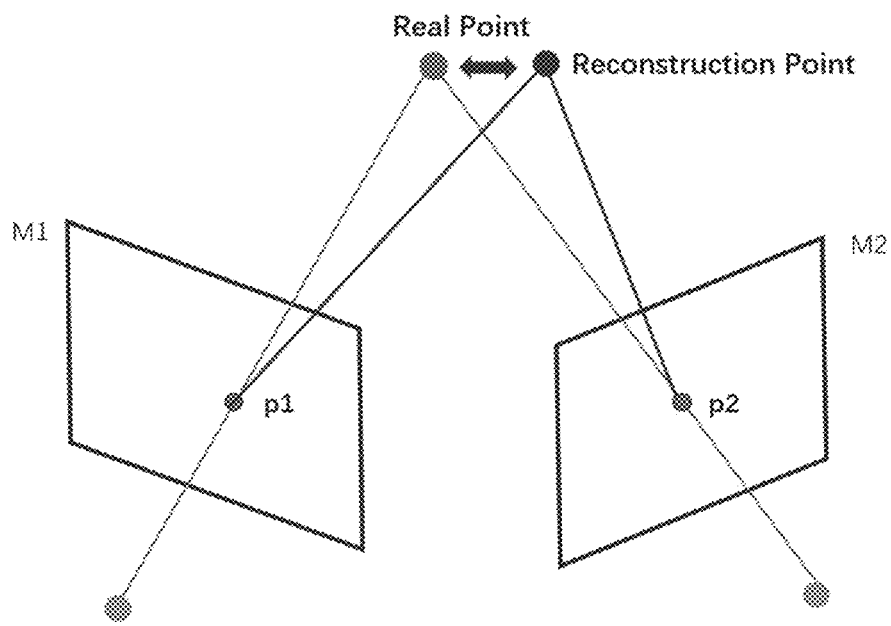
FIG. 5 illustrates a schematic diagram for reconstruction error assessment.

FIG. 5 illustrates a schematic diagram for reconstruction error assessment. The reconstruction error is similar to the reprojection error, except that the reprojection error calculates the distance between pixels, while the reconstruction error calculates the distance in space.

The comparison is performed for three typical calibration distances: close-range (~30 cm), middle-range (~3 m) and long-range (~7 m).

Table 1-3 respectively show comparison results for reprojection errors, reconstruction (i.e., spatial) errors and calibration times of the Zhang Zhengyou calibration method, DLT calibration method, camera self-calibration method and the method provided by the present invention.

TABLE 1 comparison results for reprojection errors

| Reprojection error/pixel | Zhang Zhengyou Calibration | Direct Linear Transformation | Camera Self-Calibration | Present Invention |
|---|---|---|---|---|
| Close-Range Calibration | 0.347 | 2.431 | 8.13 | Can not detect |
| Middel-Range Calibration | 0.445 | 3.756 | 7.88 | 4.725 |
| Long-Range Calibration | Can not detect | 4.341 | 10.12 | 4.542 |

TABLE 2 comparison results for spatial errors

| Spatial error/mm | Zhang Zhengyou Calibration | Direct Linear Transformation | Camera Self-Calibration | Present Invention |
|---|---|---|---|---|
| Close-Range Calibration | 2.64 | 8.73 | 42.05 | Can not detect |
| Middel-Range Calibration | 3.11 | 10.67 | 576 | 11.80 |
| Long-Range Calibration | Can not detect | 9.70 | 655 | 13.60 |

TABLE 3 comparison results for calibration time

| time/s | Zhang Zhengyou Calibration | Direct Linear Transformation | Camera Self-Calibration | Our Method |
|---|---|---|---|---|
| Close-Range Calibration | 90 | 1200 | 5 | Can not detect |
| Middel-Range Calibration | 90 | 1200 | 5 | 50 |
| Long-Range Calibration | Can not detect | 1200 | 5 | 50 |

While the method developed by Zhang Zhengyou delivers solid results in both short-distance and mid-distance calibrations, it fails to be detected during long-distance calibration. This is primarily due to the fact that the checkerboard becomes indistinct at greater distances, preventing the system from accurately identifying points on the checkerboard.

The camera self-calibration method, though fast, lacks the necessary precision, necessitating constant iteration for optimization. As for the direct linear transformation method, it successfully calibrates over long distances but is considerably time-consuming.

Overall, the method provided by the present invention outperforms the other methods in the context of long-distance calibration. Therefore, for large-scale scene calibration, the provided method emerges as the superior choice due to its balance of speed, accuracy, and effectiveness at longer distances.

The embodiments were chosen and described in order to best explain the principles of the invention and its practical application, thereby enabling others skilled in the art to understand the invention for various embodiments and with various modifications that are suited to the particular use contemplated. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations. While the apparatuses disclosed herein have been described with reference to particular structures, shapes, materials, composition of matter and relationships . . . , etc., these descriptions and illustrations are not limiting. Modifications may be made to adapt a particular situation to the objective, spirit and scope of the present disclosure. All such modifications are intended to be within the scope of the claims appended hereto.

The invention claimed is:

1. A machine learning-based method for calibrating a camera with respect to a scene, comprising:
    setting up, in the scene, a plurality of light sources including: a first group of light sources arranged in a non-linear manner on a first plane and a second group of light sources arranged in a non-linear manner on a second plane orthogonal to the first plane; labelling each light source with a serial number;
    labelling each light source with a serial number;
    determining 3D global coordinates of each light source in the scene;
    configuring the plurality of light sources to luminate sequentially in a specific order;
    configuring the camera to capture a video of the scene over a capturing period when the plurality of light sources is configured to sequentially luminate;
    extracting 2D pixel coordinates of each light source from the captured video using an object detection machine-learning model;
    matching 3D global coordinates for each light source with respective 2D pixel coordinates to construct a projective relation; and
    obtaining a projection matrix of the camera from the constructed projective relations.

2. The machine learning-based method according to claim 1, wherein the object detection machine-learning model is configured to:
    receive a plurality of video frames from the captured video; and
    sequentially process the video frames to generate an object detection output for each video frame, wherein the object detection output for each video frame contains the serial number and 2D pixel coordinates of the light source that luminates in the video frame.

3. The machine learning-based method according to claim 2, wherein the object detection machine-learning model is configured to determine the serial number of the light source that luminate in each of the video frame based on the specific order of the light sources being configured to luminate sequentially.

4. The machine learning-based method according to claim 3, wherein the object detection machine-learning model is further configured to:
generate a spatial feature map for the video frame using a convolutional layer; and
generate the 2D pixel coordinates of the light source that luminates in the video frame based on the spatial feature map.

5. The machine learning-based method according to claim 1, further comprising training the object detection machine-learning model over a plurality of training iterations.

6. The machine learning-based method according to claim 5, wherein each training iteration comprises feeding a training video frame including a training light source that luminates in the training video frame to the object detection machine-learning model to obtain a predicted bounding box of the training light source.

7. The machine learning-based method according to claim 6, wherein each training iteration further comprises:
obtaining a loss function according to a ratio of an intersection area to a union area of the predicted bounding box and a true bounding box, wherein the true bounding box is a bounding box of the training light source marked in advance in the training video frame; and
adjusting parameters of the object detection machine-learning model by utilizing the loss function to train the object detection machine-learning model.

8. The machine learning-based method according to claim 7, wherein each training iteration further comprises:
adjusting the parameters of the object detection machine-learning model by utilizing the loss function to maximize the ratio of the intersection area to the union area of the predicted bounding box and the true bounding box.

9. The machine learning-based method according to claim 8, wherein obtaining the loss function according to the ratio of the intersection area to the union area of the predicted bounding box and the true bounding box comprises:
for at least one pixel point located within the true bounding box in the training video frame, determining a first 4-dimensional vector and a second 4-dimensional vector, wherein elements in the first 4-dimensional vector are distances from the pixel point to the top, bottom, left and right bounds of the true bounding box respectively, and elements in the second 4-dimensional vector represent distances from the pixel point to the top, bottom, left and right bounds of the predicted bounding box corresponding to the pixel point respectively;
obtaining an area of the true bounding box according to the first 4-dimensional vector;
obtaining an area of the predicted bounding box according to the second 4-dimensional vector;
obtaining an intersection area of the predicted bounding box and the true bounding box according to the first 4-dimensional vector and the second 4-dimensional vector; and taking a difference between a sum of the acquired area of the predicted bounding box and the acquired area of the true bounding box and the acquired intersection area as the union area.

10. The machine learning-based method according to claim 9, wherein the first loss function is a negative value of a natural logarithm of the ratio of the intersection area to the union area of the predicted bounding box and the true bounding box.

11. A non-transitory computer-readable storage medium storing a program including instructions for performing a non-transitory computer-readable storage medium of claim 1.

12. The non-transitory computer-readable storage medium according to claim 11, wherein the object detection neural network is configured to:
receive a plurality of video frames from the captured video; and
sequentially process the video frames to generate an object detection output for each video frame, wherein the object detection output for each video frame contains the serial number and 2D pixel coordinates of the light source that luminates in the video frame.

13. The non-transitory computer-readable storage medium according to claim 12, wherein the object detection neural network is configured to determine the serial number of the light source that luminate in each of the video frame based on the specific order of the light sources being configured to luminate.

14. The non-transitory computer-readable storage medium according to claim 13, wherein the object detection neural network is further configured to:
generate a spatial feature map for the video frame using a convolutional layer; and
generate the 2D pixel coordinates of the light source that luminates in the video frame based on the spatial feature map.

15. The non-transitory computer-readable storage medium according to claim 11, further comprising training the object detection neural network over a plurality of training iterations.

16. The non-transitory computer-readable storage medium according to claim 15, wherein each training iteration comprises feeding a training video frame including a training light source that luminates in the training video frame to the object detection neural network to obtain a predicted bounding box of the training light source.

17. The non-transitory computer-readable storage medium according to claim 16, wherein each training iteration further comprises:
obtaining a loss function according to a ratio of an intersection area to a union area of the predicted bounding box and a true bounding box, wherein the true bounding box is a bounding box of the training light source marked in advance in the training video frame; and
adjusting parameters of the object detection neural network by utilizing the loss function to train the object detection neural network.

18. The non-transitory computer-readable storage medium according to claim 17, wherein each training iteration further comprises:
adjusting the parameters of the object detection neural network by utilizing the loss function to maximize the ratio of the intersection area to the union area of the predicted bounding box and the true bounding box.

19. The non-transitory computer-readable storage medium according to claim 18, wherein obtaining the loss function according to the ratio of the intersection area to the union area of the predicted bounding box and the true bounding box comprises:
- for at least one pixel point located within the true bounding box in the training video frame, determining a first 4-dimensional vector and a second 4-dimensional vector, wherein elements in the first 4-dimensional vector are distances from the pixel point to the top, bottom, left and right bounds of the true bounding box respectively, and elements in the second 4-dimensional vector represent distances from the pixel point to the top, bottom, left and right bounds of the predicted bounding box corresponding to the pixel point respectively;
- obtaining an area of the true bounding box according to the first 4-dimensional vector;
- obtaining an area of the predicted bounding box according to the second 4-dimensional vector;
- obtaining an intersection area of the predicted bounding box and the true bounding box according to the first 4-dimensional vector and the second 4-dimensional vector; and
- taking a difference between a sum of the acquired area of the predicted bounding box and the acquired area of the true bounding box and the acquired intersection area as the union area.

20. The non-transitory computer-readable storage medium according to claim 19, wherein the first loss function is a negative value of a natural logarithm of the ratio of the intersection area to the union area of the predicted bounding box and the true bounding box.

* * * * *